United States Patent
Hashimoto

(10) Patent No.: US 6,675,439 B2
(45) Date of Patent: Jan. 13, 2004

(54) GROMMET

(75) Inventor: Takeshi Hashimoto, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 119 days.

(21) Appl. No.: 09/963,230

(22) Filed: Sep. 26, 2001

(65) Prior Publication Data

US 2002/0038492 A1 Apr. 4, 2002

(30) Foreign Application Priority Data

Sep. 29, 2000 (JP) ........................................ 2000-300757

(51) Int. Cl.$^7$ ................................................. H02G 3/22
(52) U.S. Cl. ........................ 16/2.1; 16/2.2; 174/152 G; 174/153 G
(58) Field of Search ........................... 16/2.1, 2.2, 2.5; 174/152 E, 153 G, 152 R, 152 A; 248/56

(56) References Cited

U.S. PATENT DOCUMENTS

| | | | | |
|---|---|---|---|---|
| 1,800,578 A | * | 4/1931 | Webb | 16/2.1 |
| 3,243,206 A | * | 3/1966 | Samer | 16/2.1 |
| 4,363,580 A | * | 12/1982 | Bell | 411/15 |
| 4,685,173 A | * | 8/1987 | Pavur | 16/2.2 |
| 4,928,349 A | * | 5/1990 | Oikawa et al. | 174/153 G |
| 5,608,191 A | | 3/1997 | Miguel Jorda Teixido | |
| 5,774,934 A | * | 7/1998 | Fujita et al. | 16/2.1 |
| 6,442,794 B2 | * | 9/2002 | Uchida et al. | 16/2.1 |

FOREIGN PATENT DOCUMENTS

| | | |
|---|---|---|
| EP | 1 013 508 A2 | 6/2000 |
| JP | 2002-10451 * | 1/2000 |
| JP | 2000-243163 * | 9/2000 |
| JP | 2001-251737 * | 9/2001 |

* cited by examiner

Primary Examiner—Gary Estremsky
Assistant Examiner—Mark Williams
(74) Attorney, Agent, or Firm—Gerald E. Hespos; Anthony J. Casella

(57) ABSTRACT

A one-motion grommet (10) is provided with a reduced insertion force. The grommet (10) has a small-diameter tube (11) and jaw (12) that projects back from the outer circumference of the front end of the small-diameter tube (11). The jaw (12) has a slanted outer surface (12a) with an outer diameter that increases toward the back. A body locking recess (13) is formed in or adjacent the slanted outer surface (12a) of the jaw (12). The jaw (12) is joined unitarily to the small-diameter tube (11) at a thin annular root (12c). The inner circumferential surface (11b) of the front side of the small-diameter tube (11) is flared to increase its diameter toward the front end. Thus, a gradually widening clearance is defined between the front side of the small-diameter tube (11) and the bundle of wires (W).

6 Claims, 4 Drawing Sheets

FBD →

GROMMET

BACKGROUND OF THE INVENTION

1. Field of the Invention

The invention relates to a grommet that can be assembled onto a wiring harness and mounted in a through hole formed in a body panel of an automotive vehicle. The grommet protects the wiring harness and makes a portion where the wiring harness is introduced into the through hole waterproof and dustproof.

2. Description of the Related Art

A grommet typically is mounted on a wiring harness that will extend from an engine compartment to a passenger compartment of an automotive vehicle. The grommet and the wiring harness then are mounted in a through hole of a body panel that partitions the engine compartment from the passenger compartment. Accordingly, the grommet protects the wiring harness at the through hole and prevents the flow of water, dust and sound from the engine compartment to the passenger compartment.

A grommet of the type described above is referred to as a "one-motion grommet" and has a body-locking recess around its outer periphery. The body locking recess is configured for engagement with the surrounding edge of a through hole of a body panel merely by pushing the grommet into the through hole in one direction. A one-motion grommet has the potential for easy mounting.

A known one-motion grommet is disclosed in Japanese Unexamined Utility Model Publication No. 4-40823 and also is identified by the numeral 1 in FIG. 4 herein. The grommet 1 is formed with a small diameter tube 2 that is continuous with a large-diameter tube 3. A bundle of wires W is introduced through the small diameter tube 2, and closely contacts the inner surface of the small diameter tube 2. A stepped thick portion 4 is formed on the outer circumferential surface of the large-diameter tube 3, and a body locking recess 5 is formed in the outer circumferential surface of the stepped thick portion 4. Finally, a slit 6 is formed in the thick portion 4 and an annular metallic core 7 is pressed into the slit 6.

The grommet 1 is pushed in the direction of arrow Q from an engine compartment (X) to a passenger compartment (Y) without the annular metallic core 7 in the slit 6. More particularly, a slanted surface 5a adjacent the body locking recess 5 engages an edge of a body panel 8 that surrounds a through hole 9 formed in the body panel 8. As a result, the stepped thick portion 4 is deformed inwardly into the cut-away portion 6 of the grommet 1. Further pushing enables the slanted surface 5a to pass through the through hole 9 in the body panel 8. The stepped thick portion 4 is restored to its original shape after passing through the through hole 9, so that the body panel 8 is locked in the body locking recess 5. The annular metallic core 7 is pressed into the slit 6 after the body panel 8 is engaged in the body locking recess 5 to prevent the grommet 1 from coming off into the engine compartment X.

The thick portion 4 in which the body locking recess 5 is formed has a low elastic locking force. Thus, the separate annular metallic core 7 is required to prevent the grommet 1 from coming off into the engine compartment X. However, the need to assemble the grommet 1 and the annular metallic core 7 requires an additional operation step after the grommet 1 is mounted.

Further, the large-diameter portion 3 is spaced outward from the wiring harness W to facilitate inward elastic deformation of the stepped thick portion 4 at the insertion side of the body locking recess 5 when the grommet 1 is mounted into the through hole. Thus, the through hole 9 in the body panel 8 must be larger than the outer diameter of the wire bundle W. However, it is preferable to minimize the size of the through hole 9 in the body panel 8 for soundproofing purposes.

In view of the above problems, an object of the invention is to enable a grommet to be firmly and easily mounted on a body panel without using a separate member.

Another object of the invention is to enable a small through hole in the body panel.

SUMMARY OF THE INVENTION

The invention is directed to a grommet that can be mounted on a wiring harness and inserted in an insertion direction into a through hole of a panel. The grommet may be formed integrally or unitarily of a rubber or elastomer and is configured for engaging portions of the panel adjacent the through hole.

The grommet includes a small-diameter tube with opposite front and rear ends and an inner circumferential surface extending between the ends. The inner circumferential surface of the small diameter tube is dimensioned to receive and closely engage a bundle of wires. A jaw projects in a fold-back direction from the outer circumference of the front end of the small-diameter tube, and a body locking recess is formed in the jaw. The jaw comprises at least one thinned wall that allows a substantially radial movement of the jaw towards the small-diameter tube upon insertion of the grommet into the through hole. The thinned wall facilitates deflection of the jaw so that the grommet can be inserted easily and firmly into the through hole of the panel.

The jaw preferably has a slanted outer surface that gradually increases its outer diameter toward the back. The body locking recess preferably is formed in or adjacent the slanted outer surface of the jaw. The inner circumferential surface of the jaw and the outer circumferential surface of the small-diameter tube meet substantially at a base end of the slanted surface of the jaw, thereby thinning the base end.

The jaw is folded back and outwardly from the front end of the small-diameter tube, and thus a forward-acting elastic force is provided to the jaw. The body locking recess in the outer circumferential surface of the jaw firmly engages the body panel, and thus the grommet does not come off the body panel and into the engine compartment. Consequently, there is no need for the metallic core that is required to prevent the prior art grommet from coming off the body panel.

A large annular clearance is defined between the jaw and the small diameter tube at the time of mounting the grommet onto the body panel. The outer circumferential surface of the small-diameter tube is slanted outwardly so that the annular clearance is tapered toward its front end. Additionally, the front end of the clearance is more forward than the body locking recess. These relative dispositions effectively thin a portion of the jaw at the front end of the clearance. The thinned wall portion preferably is at a radial position that corresponds substantially to the edge of the through hole of the panel. As a result, the jaw is easily deformable about the thinned portion, and the slanted surface adjacent and forward of the body locking recess can easily pass the through hole. Thus, unlike the prior art, the jaw is easily deformable, and the tube through which the bundle of wires is introduced need not have a large-diameter. Rather, it is sufficient to provide the jaw folded back from the leading end of the small-diameter tube through which the wires extend.

The inner circumferential surface of the front side of the small-diameter tube preferably is slanted and gradually increases its diameter toward the front end. Thus, an inner clearance between the bundle of wires and the front side of the small-diameter tube gradually increases. The small diameter tube is easily deformable because of the inner clearance at the front of the grommet and because the portion of the small-diameter tube that is continuous with the jaw is thin. Thus, the force required to insert the grommet is reduced. Further, the inner clearance advantageously enables changes to the direction of the bundle of wires coming out from the small-diameter tube.

An outer diameter of at least part of a circumferential extension of a bottom portion of the body locking recess is slightly larger than an inner diameter of the through hole of the panel. Thus a sealing and/or holding function of the grommet can be enhanced.

These and other objects, features and advantages of the present invention will become apparent upon reading of the following detailed description of preferred embodiments and accompanying drawings.

DETAILED DESCRIPTION OF THE PREFERRED EMBODIMENT

Figure 1:
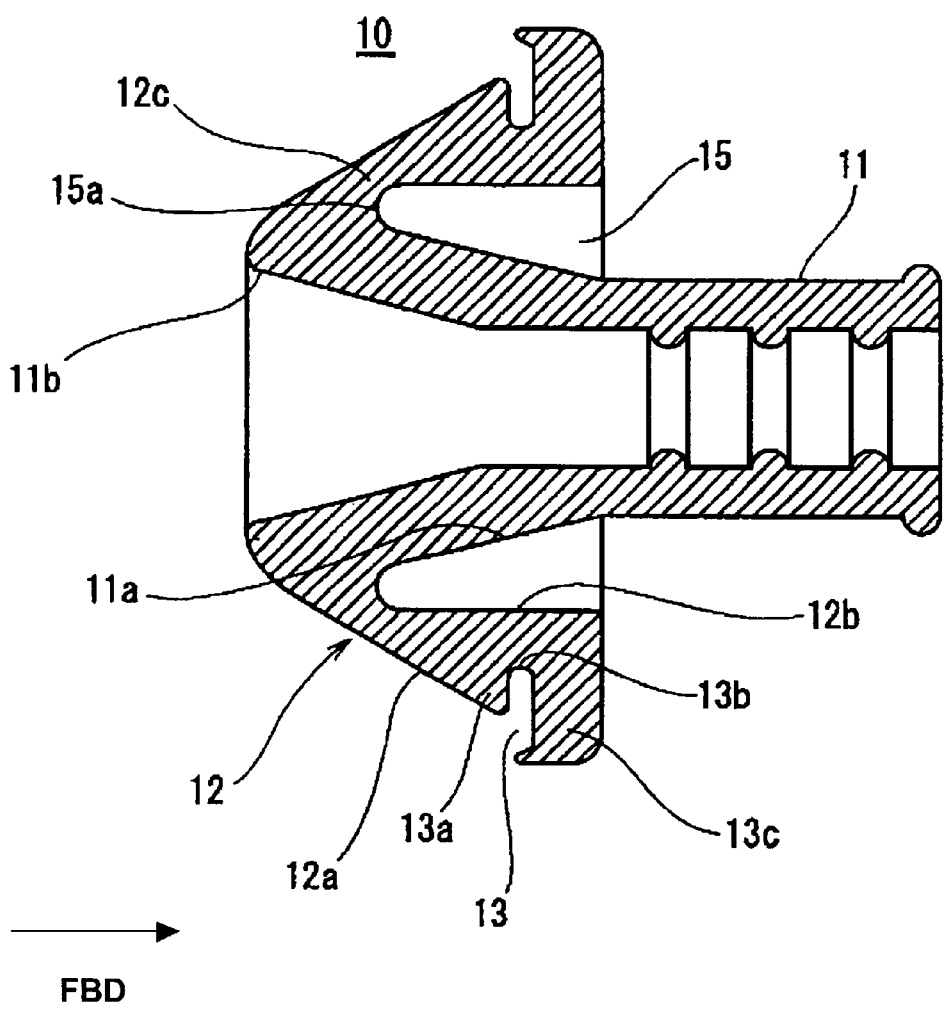
FIG. 1 is a section of a grommet according to one embodiment of the invention.
Figure 2:
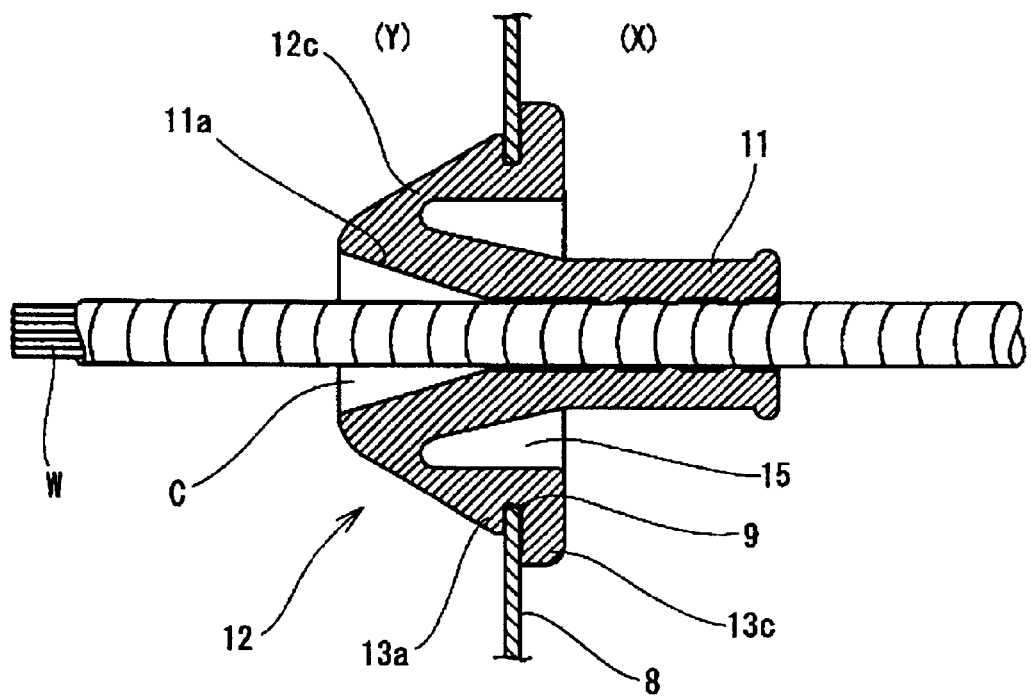
FIG. 2 is a section showing the grommet having a wiring harness introduced therethrough and mounted on a body panel.
Figure 3:
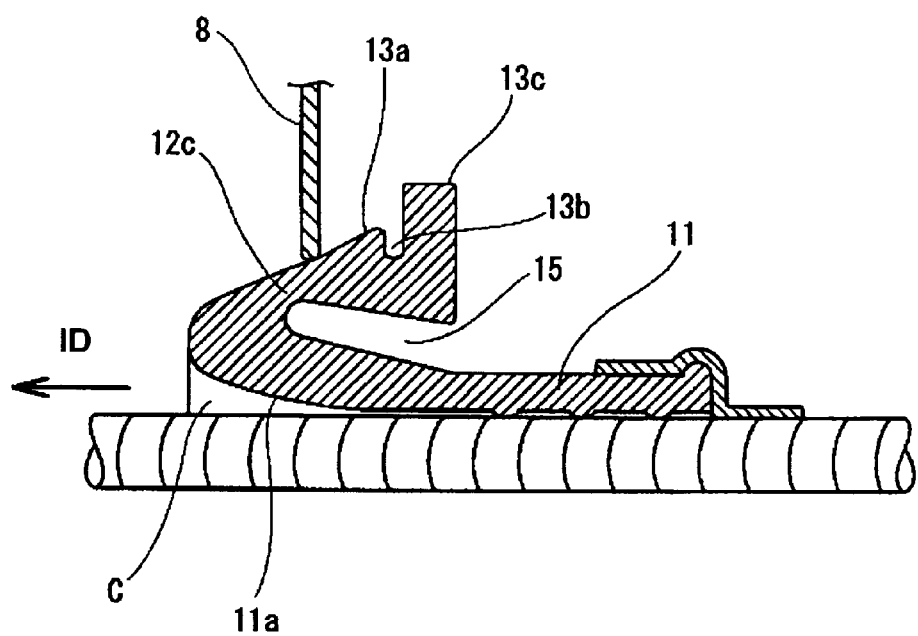
FIG. 3 is a diagram showing an action when the grommet is introduced into a through hole formed in the body panel.
Figure 4:
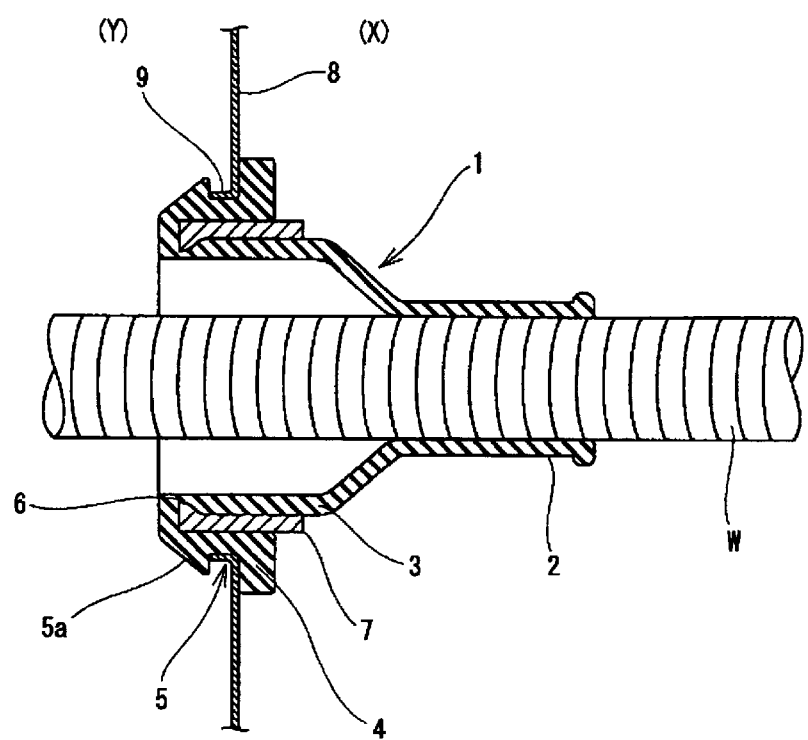
FIG. 4 is a section showing a prior art grommet.

A grommet in accordance with invention is identified by the number 10 in FIGS. 1–3. The grommet 10 is molded integrally or unitarily from a resilient material, preferably a rubber or elastomer, and includes a small-diameter tube 11 with opposite front and rear ends disposed respectively at the left and right sides of FIGS. 1–3. Interior portions of the small-diameter tube 11 adjacent the rear end are configured to closely engage a bundle of wires W passed through the grommet 10, as shown in FIGS. 2 and 3. The front end of the small-diameter tube 11 can be inserted into a through hole 9 in a body panel 8 in an insertion direction ID, as shown in FIG. 3. A jaw 12 projects in a fold-back direction FBD from the outer circumference of the front end of a small-diameter tube 11. The jaw 12 has slanted or tapered outer circumferential surface 12a with an outer diameter that increases toward the back. A body locking recess 13 is formed in the slanted outer circumferential surface 12a of the jaw 12.

The body locking recess 13 is defined by a front wall 13a with the slanted outer circumferential surface 12a of the jaw 12. The body locking recess 13 also is defined by a thick rear wall 13c that projects radially and is substantially opposed to the front wall 13a to form an annular groove or recess 13b therebetween.

An annular clearance 15 is defined between an inner circumferential surface 12b of the jaw 12 and an outer circumferential surface 11a of the small-diameter tube 11. The clearance has a closed front end 15a and an open rear end. The closed front end 15a is more forward than the body locking recess 13 along the longitudinal direction of the grommet 10, and hence the front end 15a is axially spaced from the recess 13 in the insertion direction ID. Portions of the outer circumferential surface 11a of the small-diameter tube 11 that define the clearance 15 are tapered outwardly to larger cross-sectional dimensions at locations closer to the front end 15a. Thus, the clearance 15 is tapered toward its front end 15a. The front end 15a of the clearance 15 is opposed to a base end of the slanted surface of the front wall 13a of the jaw 12. Thus, the base end of the front wall 13a defines a thinned annular root portion 12c of the jaw 12 that facilitates an inward deformation of the grommet 10 during insertion into the through hole 9.

The front end of the small-diameter tube 11 has a slanted interior surface 11b with an inner diameter that gradually increases toward the front end, thereby widening the hollow interior of the small-diameter tube 11. The widened hollow interior at the front end of the small-diameter tube 11 defines a clearance C between the outer surface of the wire bundle W and the slanted interior surface 11b of the small-diameter tube 11, as shown in FIG. 2. The slanted interior surface 11b is substantially parallel to the outer circumferential surface 11a so that the front part of the small-diameter tube 11 continuous with the jaw portion 12 has a substantially uniform thickness.

The grommet 10 can be mounted on a wiring harness W/H, as shown in FIG. 2, and pushed into the through hole 9 in the body panel 8 from an engine compartment (X) to a passenger compartment (Y). More particularly, the front end of the small-diameter tube 11 of the grommet 10 is pushed into the through hole 9. As a result, the base end 12c of the slanted front surface of the front wall 13a contacts the body panel 8. However, the base end 12c of the jaw 12 is thinned, and therefore the jaw 12 is deformed easily in response to contact with the body panel 8. This contact deforms a portion of the jaw 12 behind the body locking recess 13 toward the clearance 15. The relatively thin portion of the jaw 12 that is substantially continuous with the small-diameter tube 11 assists this deformation.

The easy deformation of the jaw 12 enables the front wall 13a to pass the through hole 9 and the inner surface of the through hole 9 is fitted into the groove 13b of the body locking recess 13. The jaw 12 is elastically or resiliently restored when pushing forces from the body panel 8 are released. Thus, the body panel 8 is held tightly between the front wall 13a and the rear wall 13c at the opposite sides of the groove 13b. The jaw 12 is folded back from the front end of the small-diameter tube 11. As a result, the jaw 12 is biased forward and the rear wall 13c is pressed elastically against the body panel 8. Furthermore, the outer diameter of the bottom of the groove 13b is slightly larger (e.g. 32.5 mm) than the inner diameter of the through hole 9 of the panel 8 (e.g. 32 mm). Consequently, a substantially radially outward force acts on the jaw 12 and enhances the sealing and holding function of the jaw 12 against the panel 8.

The jaw 12 is easily deformable due to the clearance C between the wire bundle W introduced through the grommet 10 and the front end of the small-diameter tube 11. Thus, the force required to insert the grommet 10 is low.

Even after the grommet 10 is mounted on the body panel 8, the wire bundle W can be curved easily in a desired direction at its position coming out from the grommet 10, thereby facilitating the arrangement of the wiring harness W/H.

As is clear from the above description, the preferred grommet is formed such that the jaw formed with the body locking recess is folded back from the front end of the small-diameter tube through which the wire bundle is introduced. Thus, the jaw can be deformed easily when the body panel contacts the slanted front surface of the front wall of the grommet. As a result, the grommet can be mounted on the vehicle body with a low insertion force.

A forward acting elastic or resilient force can be given to the jaw formed with the body locking recess even after the grommet is mounted on the vehicle body. Therefore, the wall at the rear side of the body locking recess can be pressed against the body panel, thereby securely preventing the grommet from coming off into the rear side.

The jaw projects from the front end of the small-diameter tube portion without providing a large-diameter tube that is continuous with the small-diameter tube. Thus, the grommet and the through hole in the vehicle body can be made smaller.

The clearance between the front end of the small-diameter tube and the wire bundle facilitates the deformation of the jaw during mounting of the grommet, thereby reducing the grommet inserting force.

What is claimed is:

1. A grommet for mounting on a bundle of wires and for insertion in an insertion direction into a through hole in a panel, the grommet being formed from an elastomer, and in an unbiased condition, comprising:
   a small-diameter tube portion having opposite front and rear ends, an outer circumferential surface and an inner circumferential surface extending between the ends, at least a portion of the inner circumferential surface of the small diameter tube portion being dimensioned for surrounding and closely contacting the bundle of wires, portions of the small-diameter tube portion adjacent the front end having a selected thickness;
   a jaw projecting in a backward direction from a location on the outer circumferential surface of the small diameter tube portion adjacent the front end of the small-diameter tube portion, the jaw having a slanted outer surface with a gradually increasing outer diameter at locations further from the front end of the small diameter tube portion, said jaw defining different radial thicknesses at different axial positions along the jaw; and
   an outwardly facing body locking recess formed in the jaw and adjacent the slanted outer surface of the jaw;
   wherein the jaw comprises at least one thinned wall portion adjacent the small diameter tube portion which allows a substantially radial movement of the jaw towards the small-diameter tube portion upon insertion of the grommet into the through hole, the thinned wall portion being thinner than the radial thicknesses at other locations on the jaw and thinner than the selected thickness of the front end of the small diameter tube portion.

2. A grommet according to claim 1, wherein the inner circumferential surface of the small-diameter tube portion adjacent the front end of the small-diameter tube portion has a slanted surface aligned to gradually increase its diameter toward the front end, for defining an inner clearance between the bundle of wires and the inner circumferential surface of the small-diameter tube portion.

3. A grommet according to claim 1, wherein a clearance is defined between the small-diameter tube portion and the jaw.

4. A grommet according to claim 3, wherein the outer circumferential surface of the small-diameter tube portion is slanted outwardly so that the clearance is tapered toward the front end of the small diameter tube portion.

5. A grommet according to claim 1, wherein the thinned wall portion is provided at a radial position substantially corresponding an edge of the panel adjacent the through hole.

6. A grommet for mounting on a bundle of wires and for insertion into a through hole in a panel, said through hole defining a selected inside diameter, said grommet being unitarily formed from an resiliently deformable material, and, in an unbiased condition, comprising:
   a small-diameter tube having opposite front and rear ends, inner and outer circumferential surfaces extending between the ends, portions of the inner circumferential surface adjacent the rear end being dimensioned for closely contacting the bundle of wires, inner and outer circumferential surface regions adjacent the front end being flared outwardly; and
   a jaw joined unitarily to the front end of the small-diameter tube at an annular root of the jaw and projecting in a backward direction, the jaw having an outwardly and forwardly facing slanted outer surface and an inner circumferential surface extending rearwardly from the annular root and spaced from the outwardly flared outer circumferential surface of the small-diameter tube, the annular root being thinner than remaining portions of the jaw and thinner than portions of the small-diameter tube adjacent the front end, an outwardly facing body locking recess being formed in the jaw adjacent the slanted outer surface, the body locking recess having an outwardly facing bottom surface with a diameter no less than the diameter of the through hole.

* * * * *